United States Patent [19]

Kisanuki et al.

[11] 4,205,918
[45] Jun. 3, 1980

[54] COLOR BALANCE INDICATING DEVICE

[75] Inventors: Tohru Kisanuki, Toyokawa; Masami Sugiyama, Sakai; Takeshi Kosaka, Osaka, all of Japan

[73] Assignee: Minolta Camera Kabushiki Kaisha, Osaka, Japan

[21] Appl. No.: 881,177

[22] Filed: Feb. 27, 1978

[30] Foreign Application Priority Data

Mar. 2, 1977 [JP] Japan .......................... 52-25769[U]

[51] Int. Cl.² .............................................. G01J 3/50
[52] U.S. Cl. ..................................... 356/404; 355/38; 356/418
[58] Field of Search ............... 356/404, 416, 418, 419; 355/38

[56] References Cited
U.S. PATENT DOCUMENTS

| | | | |
|---|---|---|---|
| 3,778,150 | 12/1973 | Aston | 355/38 |
| 3,984,185 | 10/1976 | Vinatzer | 356/404 X |

Primary Examiner—F. L. Evans
Attorney, Agent, or Firm—Watson, Cole, Grindle & Watson

[57] ABSTRACT

A hand-carriable, compact color meter for indicating proper amount of adjustment of color compensation filters interposed in the light path of a color printer for the compensation of color balance of the light illuminating a film or the slide set on the printer. The color meter includes an indicating lamp, a photocell to be exposed to the light passing through the film or slide, a plurality of optical color filters selectively disposed in front of the photocell to provide the photocell with spectral sensitivities corresponding to the spectral sensitivity of the printing paper, a plurality of fixed or variable resistors selectable in correspondence to the selection of the color filter, and an electric circuit for actuating the indicating lamp in accordance with the relationship between the output of the light measuring circuit and a reference voltage commensurate with the selected one of the resistors. In a preferred embodiment, the color meter further includes a combination of a variable resistor and a filter for determination of exposure time.

4 Claims, 6 Drawing Figures

4,205,918

COLOR BALANCE INDICATING DEVICE

BACKGROUND OF THE INVENTION

1. Field of the Invention

The present invention relates to a color balance indicating device for use in color printing for the determination of a combination of color filters for providing a print having an optimum color balance.

2. Prior Art

For the convenience of being used in a dark chamber along with a color enlarger, prior art color balance indicating devices are equipped with a large size meter and are designed to be operated with an AC power source, thus resulting in increased size and cost of the device itself. Moreover, color printing has hitherto been left exclusively to professional photographers, and so, prior art color balance indicating devices are designed to meet the demands of such professionals. This constitutes one of the factors that make prior art color enlarging devices larger in size and expensive.

A color enlarger easy to be handled even by an amateur has recently been marketed. Notwithstanding, no accessible color balance indicating device is available.

It is those unskilled in the color printing art that want such a color balance indicating device.

SUMMARY OF THE INVENTION

It is accordingly an object of the present invention to provide a color balance indicating device reduced in size and price to an extent that it is easily accessible to the amateur photographer.

There is provided according to the present invention a less expensive color balance indicating device of small size, wherein indication of various modes of setting and adjustment is achieved by light-emitting indication bodies, thereby dispensing with meters that have been incorporated in prior art devices.

DETAILED DESCRIPTION OF PREFERRED EMBODIMENTS

Figure 1:
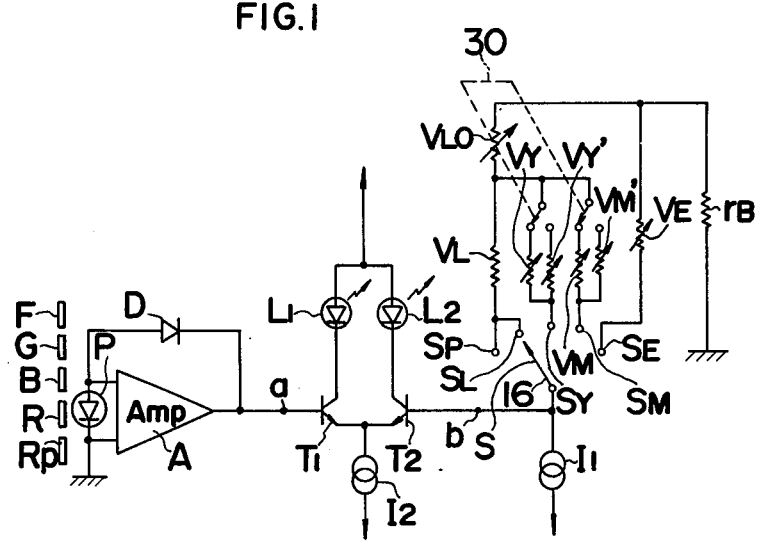
FIG. 1 is a block diagram of an electric circuit incorporated in the device of the present invention.

Referring to FIG. 1 showing a first embodiment of an electric circuit incorporated in the device of the present invention, one of a plurality of color filters such as red, blue and green filters R, B and G is selectively positioned in front of light receiving element P, such as a photodiode. The color filters serve to impart to light receiving element P a photosensitivity corresponding to the spectral sensitivity characteristic of a photosensitive layer of each primary color (hereinafter referred to as a three-primary color spectral sensitivity) of a printing sheet. Exposure-time measuring filter F imparts an overall spectral sensitivity characteristic (the total value of the three-primary color spectral sensitivities) of a printing sheet, or a visual sensitivity characteristic thereof, to light receiving element P with the measurement of an exposure time. Light receiving element P is connected between the input terminals of operational amplifier A, the output of which is in turn fed back through a logarithmically converting diode D to one input terminal of the amplifier itself, whereby there is formed light measuring circuitry for generating at output terminal a an output proportional to the logarithmic value of light incident on light receiving element P.

Shown at VLo is a level adjusting, first variable resistor, to one terminal of which are switchably connected a fixed resistor VL, a second variable resistor VY and a third variable resistor VM. The connection of these resistors to the one resistor terminal is alternatively selected by changing-over switch S, which is adapted to be changed over from one terminal to another according to a selected color filter. In this connection, changing-over switch S connects fixed resistor VL to constant current source $I_1$ when red filter R is positioned in front of light receiving element P; connects second variable resistor VY to the source when blue filter B is positioned in front of light receiving element P; connects third variable resistor to the source $I_1$ for green filter G; and connects a fourth variable resistor VE to the source $I_1$ for exposure-time measuring filter F. Variable resistor VE is connected in parallel to a series connection of first variable resistor VLo and one of resistors VL, VY, VY′, VM or VM′. rB is a biasing, fixed resistor.

Transistor $T_1$ is connected by the base thereof to output terminal a of the light measuring circuitry, and transistor $T_2$ is connected by the base thereof to output terminal b of an adjusting circuit including first through fourth variable resistors VLo, VY, VM and VE and fixed resistors VL and rB. Transistors $T_1$ and $T_2$ are connected by their emitters to common constant current source $I_2$, thereby constituting a differential amplifying circuit, to the output terminals of which are connected light-emitting diodes $L_1$ and $L_2$, respectively. The differential amplifying circuit is so arranged that in case a difference in input between transistors $T_1$ and $T_2$ is held in equilibrium, at which the above difference remains below a given value, then light-emitting diodes $L_1$ and $L_2$ are both turned on to emit light. If an input to transistor $T_1$ is higher than a given value, light-emitting diode $L_1$ alone is turned on to emit light, and if the reverse is the case, light-emitting diode $L_2$ alone emits light.

Figure 2:
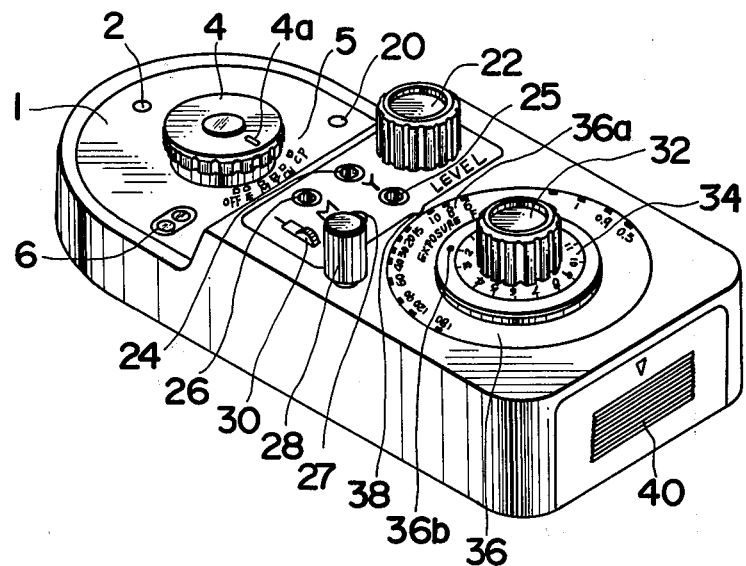
FIG. 2 shows the external appearance, as a whole, of a mechanical part of the device.
Figure 3:
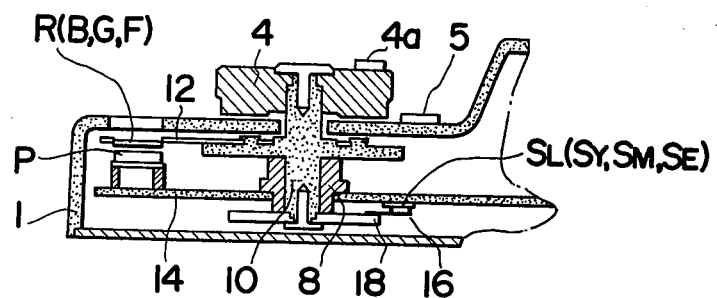
FIG. 3 is a fragmentary vertical cross-sectional view of a portion of the device.
Figure 4:
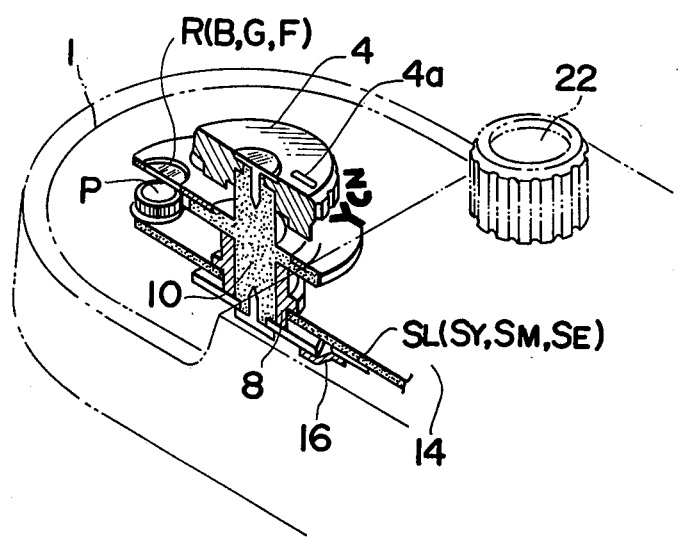
FIG. 4 is a fragmentary perspective view of the device, partly shown in cross section.
Figure 5:
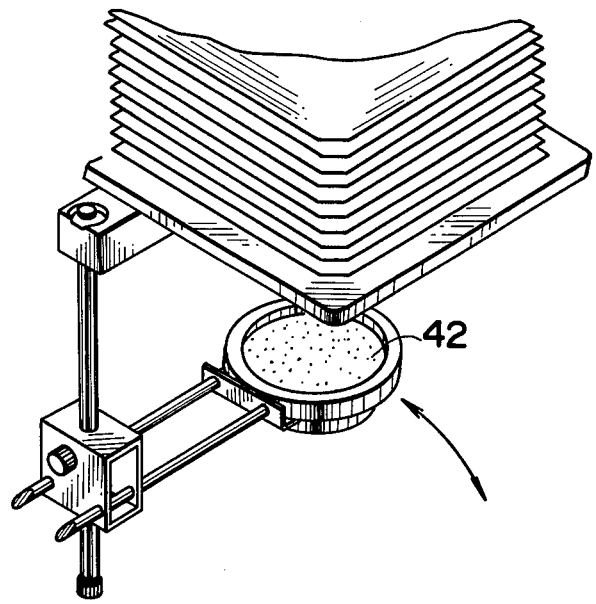
FIG. 5 is a fragmentary perspective view of a color enlarger.

FIGS. 2 through 4 illustrate the external appearance and structure of a mechanical portion of the device, in which the circuit of FIG. 1 is to be incorporated. In the front end portion of the top surface of casing 1 is provided light receiving window 2 for light receiving diode P. Shown at 6 is an indication window, through which the light from light-emitting diodes $L_1$ and $L_2$ is observed, and at 4 a measuring subject selection dial, on the top surface of which is provided indicia 4a which is respectively aligned with a series of measuring subject indication marks 5 inscribed on the top surface of casing 1. The selection dial is rigidly mounted on shaft 10 journaled by a bearing 8, which in turn is rigidly secured to a printed circuit board 14, in the manner shown in FIGS. 3 and 4. Rigidly mounted on shaft 10 are filter plate 12 for carrying red, blue, green and exposure-time measuring filters R, B, G and F, and support plate 18 for supporting sliding contact 16 of change-over switch S, which contact is adapted to slide on printed circuit board 14. Printed circuit board 14 is rigidly secured to casing 1 by a known means (not shown). On printed circuit board 14 is printed the major portion of the electric circuit of FIG. 1, and respective fixed terminals SL, SY, SM and SE of change-over switch S are formed thereon. Light receiving element P is also supported on printed circuit board 14.

The series of measuring subject indication marks 5 include: mark CN representing that red filter R is positioned in front of light receiving element P and movable contact 16 of change-over switch S is connected to fixed resistor VL for setting a reference level condition with respect to a cyanine filter of a color enlarger; mark Y for selecting a yellow filter of the color enlarger, at which blue filter B is selected and the circuitry of second variable resistor VY is completed; mark M for determining a magenta filter of the color enlarger, at which green filter G and third variable resistor VM are respectively selected; mark E for setting an exposure-level measuring condition, at which exposure-time measuring filter F and fourth variable resistor VE are respectively selected; mark OFF for cutting off the supply of current from the power source; and mark CP representing a set position for selecting another red filter $R_P$ with a view to meeting the spectral sensitivity of a red sensitive layer of a printing sheet in the case where it is desired to produce a positive print from a color positive. Shown at 20 is a warning sign window, under which is disposed a warning lamp adapted to be turned on when the light incident on light receiving element P is below a given level, so as to inform the operator of the light level. The warning lamp is connected by controlling or amplifying circuitry (not shown) to output terminal a of the light measuring circuitry.

Shown at 22 is a level-setting knob for adjusting first variable resistor VLo, and at 24 and 26 are holes for receiving therein a screw-driver for rotating adjusting screws for second and third variable resistors VY and VM. In this embodiment, a screw-driver 28 removably fitted in casing 1 is inserted in hole 24 or 26 so as to turn either of the adjusting screws in the casing. Shown at 30 is a memory stage change-over switch for connecting second and third variable resistors VY, VM, and fifth and sixth variable resistors VY', VM' alternatively to the adjusting circuitry. Fifth and sixth variable resistors VY' and VM' are used for selecting between a yellow filter and a magenta filter, like second and third variable resistors VY and VM. In practice, second and third variable resistors VY and VM, for example, are used for producing a print from a human figure picture, and fifth and sixth variable resistors VY' and VM' are used for producing a print from a landscape picture. Shown at 25 and 27 are holes for receiving therein the screw-driver for turning adjusting screws for fifth and sixth variable resistors VY' and VM'.

An exposure-time measuring knob 32 is adapted to be turned relative to casing 1 so as to adjust fourth variable resistor VE. Index graduation disc 34 is arranged to be turned usually integrally with knob 32. Exposure-time graduation disc 36, having a series of exposure-time graduations 36a along the outer circumference thereof, is fitted rotatably with proper friction on a shaft (not shown), on which knob 32 is rigidly mounted. Exposure-time graduation disc 36 is normally turned integrally with knob 32, so as to be aligned with one of graduations 36a with an indicia 38 provided on the top surface of casing 1, thereby allowing an operator to read a selected exposure time. If knob 32 alone is rotated, with exposure-time graduation disc 36 held immovable by an operator's fingers, a resultant position of knob 32 relative to disc 36 is indicated by a combination of point 36b marked on exposure-time graduation disc 36 and one of the graduations on index graduation disc 34. Shown at 40 is a lid for a cell housing, which is slidable in arrow direction 40a into an open position.

Referring first to the manner of determining a color filter of the color enlarger, when it is desired to produce a positive print from a negative, a standard reference negative, which has a color balance employable as a reference and of which a proper exposure time relative to the color balance is known, is set in the color enlarger, and then the color balance indicating device is placed on an easel. At this juncture, when it is desired to reproduce a specific portion properly (for example, a picture of a shoulder of a human figure), the color balance indicating device needs to be set on the easel such that light receiving window 2 is positioned in the specific area of an image projected by means of the color enlarger onto the easel. When it is desired to reproduce the whole picture properly, such as in the case of a landscape picture, then light mixing element 42, consisting of a combination of a condenser lens and a light-diffusing disc, is positioned in the optical path of the projected light, so that the mixed light is measured by light receiving element P.

After the color balance indicating device has been set in the manner described, dial 4 is turned to align indicia 4a with mark CN, and level setting knob 22 is turned to set first variable resistor VLo at a point at which light-emitting diodes $L_1$ and $L_2$ are both turned on. Then, dial 4 is turned to align indicia 4a with mark Y, and screw-driver 28 is inserted in hole 24 (at this juncture, memory stage change-over switch 30 has been set to select second and third variable resistors VY and VM), to thereby turn the adjusting screw for second variable resistor VY, thereby setting the second variable resistor at a point at which light-emitting diodes $L_1$ and $L_2$ are both turned on. The dial is further turned to align indicia 4a with mark M, and third variable resistor VM is adjusted by means of screw-driver 28 to be set at a position at which light-emitting diodes $L_1$ and $L_2$ are both turned on.

After second and third variable resistors VY and VM have been set at positions respectively proper to the standard reference negative, the standard reference negative is replaced with a negative to be printed. Then, dial 4 is again turned to align its indicia with mark CN, and level setting knob 22 is turned to reset first variable resistor VLo at a position at which light-emitting diodes $L_1$ and $L_2$ are both turned on. Then, indicia 4a is aligned with mark Y, and the density of the yellow filter of the color enlarger is adjusted to a level at which light-emitting diodes $L_1$ and $L_2$ are both turned on. Further, indicia 4a is then brought into coincidence with mark M, and the density of the magenta filter of the color enlarger is adjusted to a level at which light-emitting diodes $L_1$ and $L_2$ are both turned on. The adjustment in density of the yellow and magenta filters of the color enlarger in the manner described above prior to a color printing, provides a print with optimum color balance. In case of positive-to-positive printing, indicia 4a has to be brought into coincidence with mark CP, but not with mark CN. However, the other procedures are quite the same as those for negative-to-positive printing.

The above description is based on the following principle. When a standard reference negative is set in the color enlarger and indicia 4a is aligned with mark CN, potentials Va1 and Vb1 at the points a and b in the electric circuit shown in FIG. 1 are represented by the following equations:

$$Va1 = -A \log I_R \ldots \quad (1)$$

$$Vb1 = -(VL_o + VL) \ldots \quad (2)$$

wherein A is representative of a constant of a logarithmically converting diode; Ir, the power of spectral light energy incident by way of red filter R to light receiving element P; VLo a terminal-to-terminal voltage at the first variable resistor; and VL a terminal-to-terminal voltage at fixed resistor VL. When light-emitting diodes L₁ and L₂ are both turned on, then:

$$Va1 \doteq Vb1 \ldots \quad (3)$$

If the equations (1) and (2) are substituted for the equation (3), then:

$$VL_o + VL = \log I_R \ldots \quad (4)$$

In order that both light-emitting diodes L₁ and L₂ are turned on when indicia 4a is aligned with marks Y and M, respectively:

$$VL_o + VY = A \log I_B \ldots \quad (5)$$

$$VL_o + VM = A \log I_G \ldots \quad (6)$$

wherein VY and VM are representative of the terminal-to-terminal voltage at second and third variable resistors VY and VM, respectively; and $I_B$, $I_G$ are the energy of light incident through the blue and green filters to light sensitive element P, respectively. From the equations (4), (5) and (6), the following equations are obtained:

$$\frac{I_B}{I_R} = \exp\left(\frac{vY - vL}{A}\right) \quad (7)$$

$$\frac{I_G}{I_R} = \exp\left(\frac{vM - vL}{A}\right) \quad (8)$$

In terms that a negative to be printed is set in the color enlarger, and indicia 4a is brought into coincidence with marks CN, Y and M, respectively, a condition in which both light-emitting diodes L₁ and L₂ are turned on is expressed by the following equations, which correspond to the equations (4), (5) and (6), respectively:

$$VL'_o + VL = A \log I'_R \ldots \quad (9)$$

$$VL'_o + VY = A \log I'_B \ldots \quad (10)$$

$$VL'_o + VM = A \log I'_G \ldots \quad (11)$$

This indicates that fixed resistor VL, second and third variable resistors VY and VM remain unchangeable at the set positions for the standard reference negative, but the powers of spectral light energy incident on first variable resistor VLo and respective filters alone changes. From the equations (9), (10) and (9), (11), the following equations will apply:

$$\frac{I'_B}{I'_R} = \exp\left(\frac{vY - vL}{A}\right) \quad (12)$$

$$\frac{I'_G}{I'_R} = \exp\left(\frac{vM - vL}{A}\right) \quad (13)$$

By a comparison of equations (12), (13) with equations (7), (8), it is seen that equations (12) and (7) are the same in the right members thereof; the same is the case with equations (13) and (8); and the ratio among the powers of spectral energy $I'_R$, $I'_B$ and $I'_G$ for negative to be printed is the same as that for the standard reference negative.

Referring to the measurement of an exposure time, dial 4 is turned to align indicia 4a with mark R, and knob 32 is turned, to thereby turn index graduation disc 34 as well as exposure-time graduation disc 36, whereby one of the exposure-time graduations 36a (for example, 10 second as shown in FIG. 2), is aligned with indicia 38, which graduation corresponds to a proper exposure time preset for a reference negative. Then, the standard reference negative is set in the color enlarger, and the light receiving window is positioned in registration with a desired measuring portion of a projected image. When it is desired to effect light measurement uniformly over the entire surface of the picture, such light measurement is easily achieved by using light mixing element 42 as in the case of determination of the filters. Thereafter, with exposure-time graduation disc 36 held immovable by an operator's fingers, knob 32 is turned until both light-emitting diodes L₁ and L₂ are turned on. Then, the reference negative is replaced with a negative to be printed, and exposure-time graduation disc 36 is turned by means of knob 32. An operator thus knows the real value of exposure time from the graduation at which both light-emitting diodes L₁ and L₂ are turned on, and can effect the printing at a proper exposure time according to the value thus indicated. In determination of an exposure time, if the output from the light measuring circuit is brought into balance with a terminal-to-terminal voltage at variable resistor VE, there is determined a proper exposure time for a negative to be printed, which corresponds to a proper exposure time for the standard reference negative. In case of determining a proper exposure time for a negative to be printed, it may be possible to maintain exposure-time graduation disc 36 immovable, and in turn to vary an aperture value of the color enlarger until both light-emitting diodes L₁ and L₂ are turned on.

In determining a color filter as well as in setting a level for a negative to be printed, it is basically possible to adjust the density of a cyanine filter of the color enlarger, instead of adjusting the first variable resistor, but the above-described procedures are preferable from the practical viewpoint.

Figure 6:
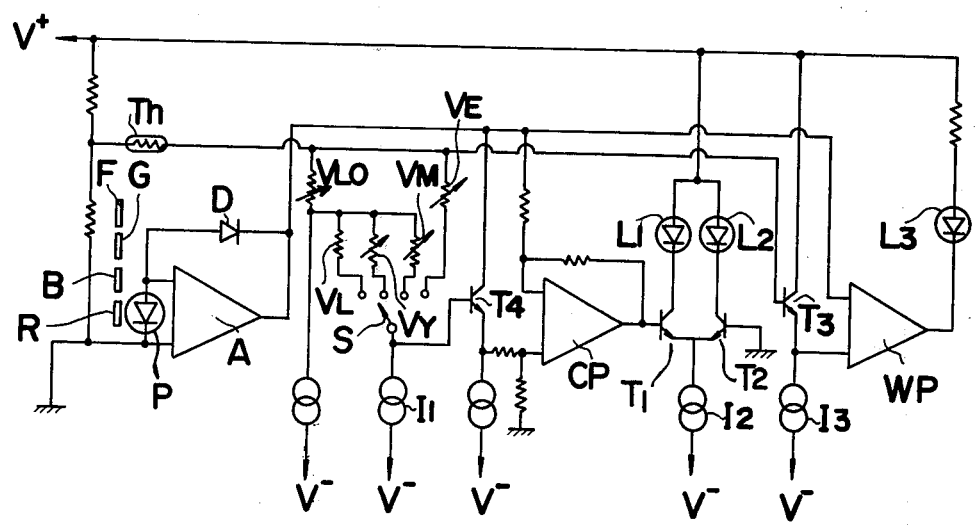
FIG. 6 is a block diagram of an electric circuit according to another embodiment of the invention.

FIG. 6 shows an electric circuit according to another embodiment of the present invention, wherein elements common to those in the electric circuit shown in FIG. 1 are identified with the same reference numerals. The electric circuit shown in FIG. 6 is based on the same principle as that in FIG. 1. In this circuit, the outputs of the light measuring circuitry and adjusting circuitry are fed as inputs to the input terminals of a first comparator circuit CP, and differential amplifying circuits T₁ and T₂ are arranged to control the lighting of light-emitting diodes L₁ and L₂ according to the difference between the outputs from comparator circuit CP and the reference level. This is for the purpose of providing an improved measuring accuracy. Transistor $T_3$, second comparator circuit WP and constant voltage source $I_3$ form a warning circuit for giving a warning by extinguishing light-emitting diode $L_3$ when the power of energy of light incident on light sensitive element P is below a given level. Light-emitting diode $L_3$ is positioned to be observed by an operator through indication window 20 as shown in FIG. 2. Reference $T_4$ and Th represent a temperature compensating transistor and thermistor, respectively.

What has been described should be construed as illustrating the principle of the present invention, but not in a limitative sense. It is readily understood by those skilled in the art that various changes and modifications may be made. For example, the indication circuit may be so arranged that only a single light-emitting body be used for color balance indication, or one light-emitting element may be provided for each mode "OVER", "PROPER" or "UNDER".

What is claimed is:

1. A color balance indicating device for use with a photographic color printer which projects on a printing paper an image of a film illuminated by the light passing through at least a part of each of a plurality of color filters, said indicating device comprising:
    a light measuring circuit including a photoelectric element for receiving light passing through said film and generating a signal commensurate with the intensity of the light incident on said photoelectric element;
    a plurality of optical filters selectively settable at a position to cover said photoelectric element so that the element has the spectral sensitivities corresponding to the spectral sensitivities of the printing paper for the three primary colors;
    means for generating reference signals, and including a first variable resistor for level setting, a fixed resistor connected in series with said first variable resistor, a second and a third variable resistor selectively connectable in series with said first variable resistor, an output terminal, a selecting switch for selectively connecting any one of said fixed resistor, said second variable resistor and said third variable resistor to said output terminal, and said reference signal being commensurate with the resistor connected to said output terminal;
    indicator means for emitting light for indication;
    means for actuating said indicator means in accordance with said reference signal and the signal from said light measuring circuit;
    a housing for the indicating device;
    subject measuring indication means including indicia and indication marks selectively aligned with said indicia for indicating the subject to be measured; and
    a manually operative member including a first support member for supporting said plurality of optical filters, a second support member for supporting the movable part of said selecting switch, a manually accessible member and a shaft rigidly carrying said first and second support members and said manually accessible member so that the first and second support members and the manually accessible member are manually rotated by rotation of said shaft, one of said indicia and marks being carried by said manually accessible member and the other being carried by said casing.

2. A color balance indicating device as in claim 1 wherein said means for generating reference signals includes a constant current source for supplying constant current to the resistor selected by said selecting switch.

3. A color balance indicating device as in claim 2 wherein said light measuring circuit includes means for generating a signal proportional to the logarithm of the light intensity incident on said photoelectric element.

4. A color balance indicating device as in claim 3 wherein said actuating means includes a differential amplifier having a pair of input terminals respectively connected to the output of said light measuring circuit and said means for generating reference signals, and said indicator means includes a pair of indicator lamps respectively connected with each output of said amplifier, whereby both of said lamps are lit when the signals applied to said amplifier balance, and either one of the lamps is lit when the signals do not balance.

5. A color balance indicating device as in claim 4 wherein said lamps are respectively light emitting diodes.

6. A color balance indicating device as in claim 2 wherein said actuating means includes a first differential amplifier having a pair of inputs connected to said output of said light measuring circuit and said means for generating reference signals, means for generating a reference level voltage, and a second differential amplifier for actuating said indicator means in accordance with the relationship of the output signal of said first differential amplifier with said reference level.

7. A color balance indicating device as in claim 1 further comprising a fourth variable resistor connectable to said output of said means for generating reference signals, a second manual member for adjusting said fourth variable resistor, an optical filter member for providing said photoelectric element with sensitivity for substantially the overall visual spectral band, said fourth variable resistor being adapted for the indication of exposure time for printing.

8. A color balance indicating device as in claim 1 further comprising means for mixing the light passed through the film.

9. A color balance indicating device as in claim 8 wherein said mixing means includes a light scattering plate.

10. A color balance indicating device as in claim 8 wherein said mixing means includes a light converging lens.

11. A color balancing indicating device as in claim 1, further comprising a base plate including a bearing for said shaft, and carrying said photoelectric element and a printed circuit for said means for generating including the stationary component of said selecting switch.

12. A color balance indicating device as in claim 1 further comprising a second indicator means, a second means for providing a reference level, and a comparison means for comparing the light measuring circuit signal and said reference level to selectively deactuate said second indicating means when light detected by said light measuring circuit is below a given level.

13. A color balance indicating device as in claim 1 further comprising temperature compensation means coupled with said means for generating reference signals.

14. A color balance indicating device as in claim 4 further comprising a comparator circuit having an output connected to one of said pair of input terminals and an input connected to the light measuring circuit signal.

* * * * *